(12) United States Patent
Rhee et al.

(10) Patent No.: US 8,898,644 B2
(45) Date of Patent: Nov. 25, 2014

(54) EFFICIENT UNIFIED TRACING OF KERNEL AND USER EVENTS WITH MULTI-MODE STACKING

(71) Applicant: NEC Laboratories America, Inc., Princeton, NJ (US)

(72) Inventors: Junghwan Rhee, Princeton, NJ (US); Hui Zhang, Princeton Junction, NJ (US); Nipun Arora, Plainsboro, NJ (US); Guofei Jiang, Princeton, NJ (US); Kenji Yoshihira, Princeton Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 70 days.

(21) Appl. No.: 13/901,964

(22) Filed: May 24, 2013

(65) Prior Publication Data
US 2013/0318505 A1 Nov. 28, 2013

Related U.S. Application Data

(60) Provisional application No. 61/651,676, filed on May 25, 2012.

(51) Int. Cl.
*G06F 9/44* (2006.01)
*G06F 11/36* (2006.01)
*G06F 11/34* (2006.01)

(52) U.S. Cl.
CPC ........ *G06F 11/3636* (2013.01); *G06F 11/3466* (2013.01)

USPC ............................ 717/128; 717/124; 717/127

(58) Field of Classification Search
None
See application file for complete search history.

(56) References Cited

U.S. PATENT DOCUMENTS

| | | | |
|---|---|---|---|
| 6,848,100 B1 * | 1/2005 | Wu et al. ................... | 717/157 |
| 7,290,246 B2 * | 10/2007 | Cyran et al. .............. | 717/130 |
| 7,877,642 B2 * | 1/2011 | Ding et al. ................ | 717/133 |
| 2004/0083460 A1 * | 4/2004 | Pierce ....................... | 717/131 |
| 2006/0075386 A1 * | 4/2006 | Loh et al. .................. | 717/124 |
| 2008/0307441 A1 * | 12/2008 | Kuiper et al. ............. | 719/321 |
| 2008/0313656 A1 * | 12/2008 | Klein et al. ............... | 719/320 |
| 2012/0191893 A1 * | 7/2012 | Kuiper et al. ............. | 710/269 |
| 2013/0159977 A1 * | 6/2013 | Crosetto et al. ........... | 717/128 |

OTHER PUBLICATIONS

"Stack Walking in Xperf," MSDN Blogs, Aug. 2009.*
"Get Low—Collecting Detailed Performance Data with Xperf," The NT Insider, May 6, 2010I.*

\* cited by examiner

*Primary Examiner* — Insun Kang
(74) *Attorney, Agent, or Firm* — Joseph Kolodka

(57) ABSTRACT

The invention efficiently provides user code information for kernel level tracing approaches. It applies an advanced variation of stack walking called multi-mode stack walking to the entire system level and generates the unified trace where the user code and kernel events are integrated. The invention uses runtime stack information and internal kernel data structures. Therefore, source code for user level code and libraries are not required for inspection. The invention introduces the mechanism to narrow down the monitoring focus to specific application software and improve monitoring performance.

20 Claims, 5 Drawing Sheets

EFFICIENT UNIFIED TRACING OF KERNEL AND USER EVENTS WITH MULTI-MODE STACKING

RELATED APPLICATION INFORMATION

This application claims priority to both provisional application No. 61/651,676 filed May 25, 2012, the contents thereof are incorporated herein by reference.

BACKGROUND OF THE INVENTION

The present invention relates generally to system monitoring, and more particularly, to efficient unified tracing of kernel and user events with multi-mode-stacking Modern software systems are complex. They are composed of many layers such as application program binaries, application-dependent libraries, third-party libraries, low-level system libraries, and kernels. All of such layers are subject to program bugs and logic errors that can cause performance anomaly in application software. There is a need for a monitoring tool that can monitor the overall system behavior across kernel and user layers. More specific challenges in the system monitoring are as follows.

- General purpose mechanism to collect unified information of kernel and user code information
- No source code requirement for any code in the software stack
- Efficient monitoring
- Flexible handling of practical issues such as multiple processes/threads, dynamic fork and kill of processes/threads, and process transformation Many debugging techniques have been developed which can be used to solve the above challenges. Conventional user level debugging techniques such as gdb, valgrind, ptrace, and pin [gdb, valgrind, pin] are effective to inspect any code execution by enforcing the program execution in a debugging mode. However, many of these tools impose non-trivial performance overhead due to the debugging mode and it becomes the constraint in the production systems. Also since they are user level tools, they can only observe certain types of kernel level events such as system calls.

Kernel level event tracing has been used to analyze system behavior by using lowlevel operating system kernel events. This technique can investigate performance problems in a more efficient way than the user level tools. However, its downside is that the linkage between kernel evens and high level user code is missing unless the debugging mode is utilized. Thus developers need significant efforts and domain knowledge to understanding the low-level result and apply it for debugging software.

Recently Microsoft™ introduced a closely related technique to this invention that has been developed in parallel. Its technique applies a stack walking mechanism to kernel/user level monitoring for their performance analysis tool called Windows Performance Analyzer (WPA). The major difference of this and the present invention is the monitoring focus. WPA performs stack walking on all processes and all code ranges without any efforts for performance improvement. This difference between the inventive multi-mode stack walking and stack walking of WPA by Microsoft™ is illustrated in FIG. 11.

While WPA has a wide view on the system, such scheme will incur significant overhead in speed and storage. This invention's core contribution is the mechanism to narrow down the monitoring focus to specific application software and to a further finer granularity by using tracing modes.

Accordingly there is a need for improved system monitoring that can monitor overall system behavior across kernel and user layers.

BRIEF SUMMARY OF THE INVENTION

The present invention is directed to a method for providing efficient unified tracing of kernel and user events with multi-mode stack walking in a software system that includes receiving an input of tracing target and tracing mode information, the tracing target being a process or a thread of an application to be traced and the application's name is provided as input and tracing mode being a scheme to collect user code information which is involved with tracing performance and a storage amount for a log, executing kernel functions responsive to an operating system kernel execution, executing certain kernel functions being tracked and generating events for logging by a kernel events generator, collecting user code information for certain kernel events with a multi-mode stack walking component; and combining kernel events from the kernel events generator and the user code information from the multi-mode stack walking component for generating a kernel/user unified log, for kernel events reflecting system performance bugs, the unified log enables improving the debugging of code because it pinpoints the corresponding user code information.

A system expression of the invention includes, for providing efficient unified tracing of kernel and user events with multi-mode stack walking in a software system, a receiving an input of tracing target the tracing mode information, said tracing target being a process or a thread of an application to be traced and the application's name is provided as input and tracing mode being a scheme to collect user code information which is involved with tracing performance and a storage amount for a log, a module for executing kernel functions responsive to an operating system kernel execution, a kernel events generator for executing certain kernel functions being tracked and generating events for logging; a multi-mode stack walking component for collecting user code information for certain kernel events; and a kernel/user unified log generated by combining kernel events from the kernel events generator and the user code information from the multi-mode stack walking component, for kernel events reflecting system performance bugs, the unified log enables improving the debugging of code because it pinpoints the corresponding user code information.

These and other advantages of the invention will be apparent to those of ordinary skill in the art by reference to the following detailed description and the accompanying drawings.

DETAILED DESCRIPTION

The present invention is directed to a system and method that efficiently provides user code information for kernel level tracing approaches. It applies an advanced variation of stack walking called multi-mode stack walking to the entire system level and generates the unified trace where the user code and kernel events are integrated. This invention uses runtime stack information and internal kernel data structures. Therefore, source code for user level code and libraries are not required for inspection. This invention introduces the mechanism to narrow down the monitoring focus to specific application software and improve monitoring performance. In addition, modern large scale software has practical challenges such as dynamically forking and killing multiple processes/threads. Also a process can load another binary and turn into another program. This invention increases its practicality and effectiveness by handling these issues. Its design resides in the operating system kernel and dynamically adjusts the monitoring scope as it observes low level events regarding processes. Furthermore, it further provides multiple monitoring schemes to flexibly adjust the monitoring scope and increase efficiency depending on debugging strategies.

Figure 1:
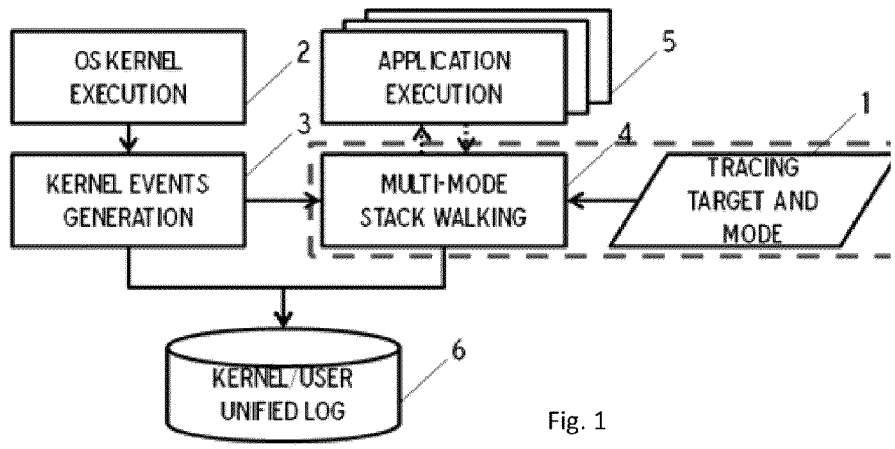
FIG. 1 shows an exemplary system configuration of a multi-mode stack walking, in accordance with the invention.

FIG. 1 shows an exemplary configuration of multi-mode stack walking, in accordance with the invention. This invention entails how the new mechanism called multi-mode stack walking operates and solves existing challenges. Firstly explained is the workflow of how this invention works. The system starts with the input called Tracing Target and Tracing Mode (component 1 in FIG. 1). A Tracing Target is a process or a thread of the application to be traced and the application's name is provided as input (see component 5 in FIG. 1). Tracing Mode is the scheme to collect user code information which is involved with tracing performance and the storage amount for the log. As the operating system kernel executes (component 2 in FIG. 1), kernel functions are executed. The execution of certain kernel functions are tracked and there is a generation of kernel events for logging (component 3 in FIG. 1). For certain kernel events, this system collects user code information (component 4 in FIG. 1). The kernel events from component 3 and the user code information from component 4 are combined and generate kernel/user unified log (component 6 in FIG. 1). For the kernel events reflecting system performance bugs, this unified log will significantly improve the debugging of code because it pinpoints the corresponding user code information.

Component 4: Multi-Mode Stack Walking

Figure 2:
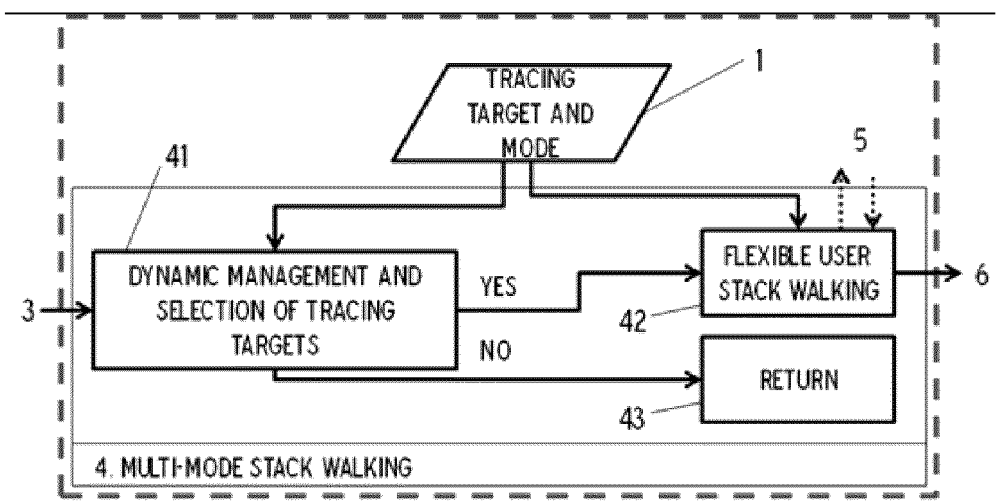
FIG. 2 details the multi-mode stack walking 4, shown in FIG. 1.

FIG. 2 presents Multi-mode stack walking (component 4) which is activated when kernel events occur (component 3 shown on the left of the FIG. 2) to generate user code information. With the given application to be traced (Tracing Target, component 1), the component 41 (Dynamic Management and Selection of Tracing Targets) efficiently determines whether current process is the tracing target. Also, this component handles dynamic change of tracing targets due to new or dying processes.

If the current process is the tracing target, the user code is collected in the component 42 (Flexible User Stack Walking) Otherwise, this component returns leading to the collection of only kernel event.

Stack walking is a technology to scan a program's stack and extract call sites which is the user code information involved with the given call. This technique has been used for the debugging of a user program or the kernel.

This component is called Multi-Mode Stack Walking since it has the following unique characteristics beyond traditional stack walking.

Dynamic handling of Multiple Processes/Threads for specific application

Multiple Tracing Modes which are the recording schemes regarding multiple code spaces for efficiency in the monitoring performance and storage of user code information Component 41: Efficient Dynamic Management and Selection of Tracing Targets The Component 41 performs the following two functionalities:

Efficient Determination whether the current process is the Tracing Target

Dynamic Tracing Scope Adjustment of Traced Processes/Threads

Figure 3:
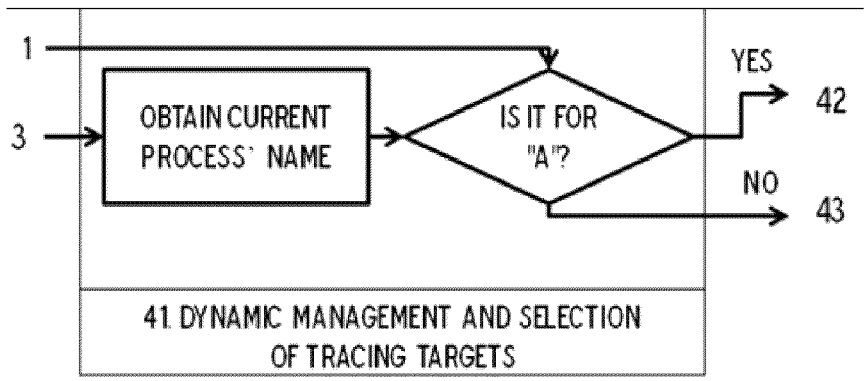
FIG. 3 shows details of the conceptual configuration of dynamic management and selection of tracing targets, component 41 shown in FIG. 2, in accordance with the invention.

The first function can be easily understood by the diagram of FIG. 3 which details component 41.

Upon the kernel events generated in the kernel shown as the component 3, this component checks whether the current process is the tracing target given from the component 1. The actual implementation can be done this way while it will be slow. The test whether the current process is the tracing target will need to compare two names by using string matching mechanisms.

String matching of the process names takes high overhead. Current techniques feature at least O(n) overhead or more such as O(nm) time where n and m are the lengths of the compared process names. This operation should be done very efficiently because it will be frequently triggered by kernel events.

To solve this problem the invention has a novel mechanism to do this operation in O(1) time using a data structure called Tracing Map based on a dynamic array. It allows the constant time determination of the tracing targets. Also it supports dynamic changes of the monitoring scope such as fork and kill of processes/threads of the program and transition of programs.

Figure 4:
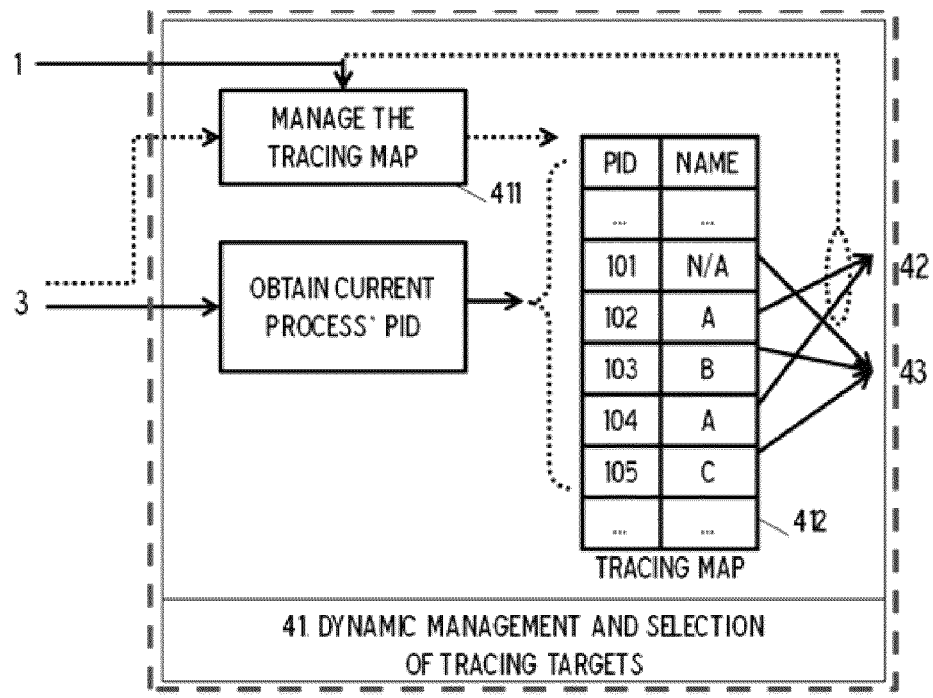
FIG. 4 details an efficient version of dynamic management and selection of tracing targets, component 41 in FIG. 2, using a tracing map, in accordance with the invention.

FIG. 4 presents an efficient version of the component 41 shown in FIG. 3. It allows the constant time determination of the tracing target.

Upon the generation of kernel events from the component 3, the process identification number (PID) of the current process is obtained. This ID is represented as an integer value. The Tracing Map is a dynamic array which is indexed by the PID value. The entries for the tracing target (in FIG. 4 the ones with the name "A") directly point to the next module performing the user code collection. Other entries such as the ones having the names "B", "C", and other unused processes are connected to the return code. By dereferencing the value using the current process' PID as an index, this data structure provides the determination whether the current kernel events should lead to the user code identification in constant time.

While this frequent check can be performed efficiently using this mechanism, the Tracing Map data structure should be created and prepared ahead to reflect the current status of processes. This is done by the component 411 in a slow path by capturing kernel events related to processes.

Component 411: Management of the Tracing Map

Figure 5:
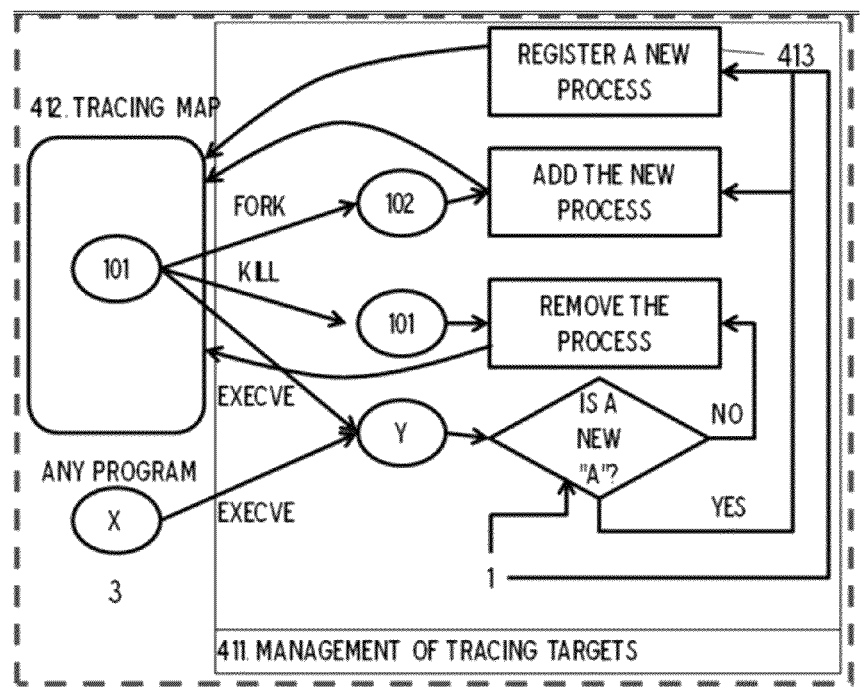
FIG. 5 details management of a tracing map, component 411 shown in FIG. 4, in accordance with the invention.

FIG. 5 explains how the Tracing Map is created and managed to enable a fast check. The issues that invalidate the information of the Tracing Map is related to dynamic changes in processes' status such as a fork of a new process and the kill of a process especially for the ones caused from the processes in the map. Therefore this module checks whether any fork or kill is triggered by the processes in the map. If it happens, add the new process to the map or remove the process from the map.

A more tricky practical issue the transformation of a process. A process can turn into another program by loading a program image by using the EXECVE (or similar variants) system call. In fact, this issue is important to be handled because it occurs often. It could be the way to recognize the first process of the tracing target because it could be turned into from a child of another process. For instance, as the user type the launching command from a shell, a child of the shell becomes the application and it is the way to capture the application. This event can be caused by any program outside the processes in the Tracing Map. Therefore the component 411 checks the EXECVE system calls from all processes as shown in the left bottom of the Figure.

For the transformed process, this module checks whether it is the tracing target. If so, it is registered in the Tracing Target and this process is to be presented in the component 413. Here this check could be more expensive than the one in FIG. 4. However, it will be necessary only for infrequent instances that start processes. Therefore the relative higher cost can be armotized.

Component 413: Registration of a Tracing target

Figure 6:
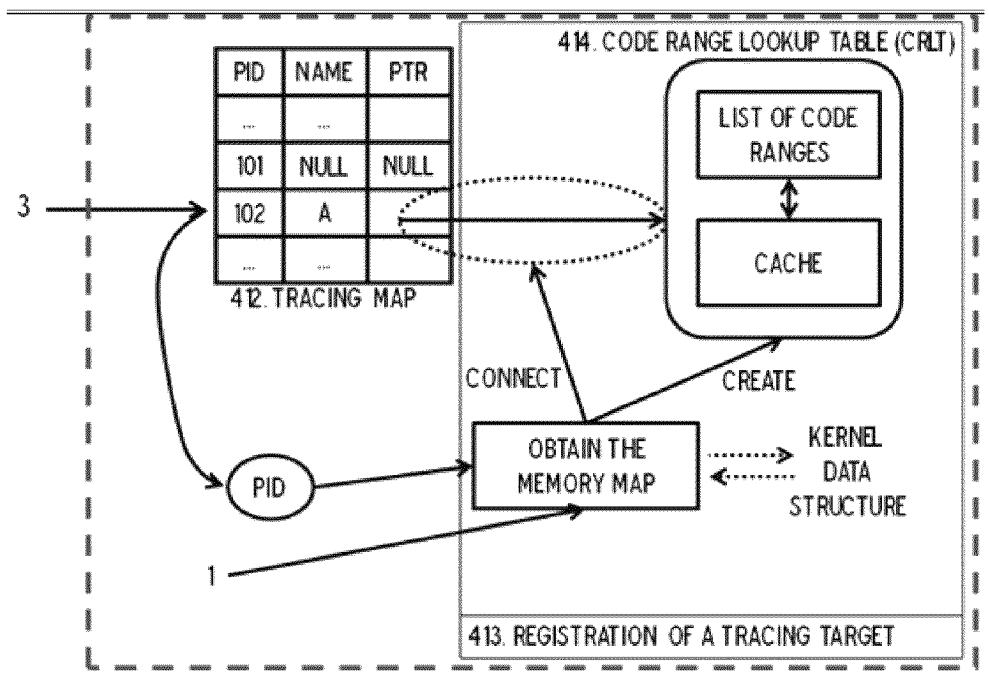
FIG. 6 details registration of a tracing target, component 413 shown in FIG. 5, in accordance with the invention.

In addition to fast determination of the tracing target, another important role of Tracing Map is to provide the information necessary for obtaining user code information (i.e., stack walking) For stack walking, it is necessary to efficiently look up the code ranges of the program. To make this information ready, upon a new tracing target is detected, the process is registered as shown in FIG. 6.

Using the PID number of the newly determined tracing target, this module inspects the memory map of this process which is stored in kernel data structures. Then create an instance of a data structure called Code Range Lookup Table (CRLT) and connect it to the Tracing Map.

Some applications can have many code ranges (e.g., over one hundred) if it uses a wide set of libraries and various plug-ins. Many enterprise applications do support such extensible features and this is a practical issue. If many code ranges exist, the lookups for code ranges could be slowed down. Therefore, we created a lookup cache which keeps several most recent lookups and speeds up the lookups.

As another idea to speed up the monitoring, we introduce tracing schemes (the component 1). Depending on the focus of monitoring, this scheme allows the specification of code ranges deciding which code spaces will be considered during the stack walking so that it can even speed up the whole tracing.

The implementation of this feature is presented in the lower part of FIG. 6. Depending on the input 1, the registration can fill CRLT with the selected code ranges and this adjustment in the monitoring focus will speed up the user code collection.

For more specific examples, for Mode 1 and 2 (to be explained later in the component 1), only the code range for the main binary is included in the CRLT. For Mode 3 and 4, all code ranges are included.

Component 42: User Code Tracking

Once it is determined whether the user code information should be collected, the component 42 is executed. The user code information means the list of user functions (more precisely callers or call sites) in the user call stack at the time when a kernel event has occurred.

Note that the whole process is triggered from a kernel event in the kernel to generate the unified trace of kernel and user information. Unlike traditional stack walkings, the monitor and the monitored target will exist in different execution spaces. The monitor, this code module, is in the kernel space. And the tracing target is in one of many user spaces which can be observable from the kernel.

Figure 8:
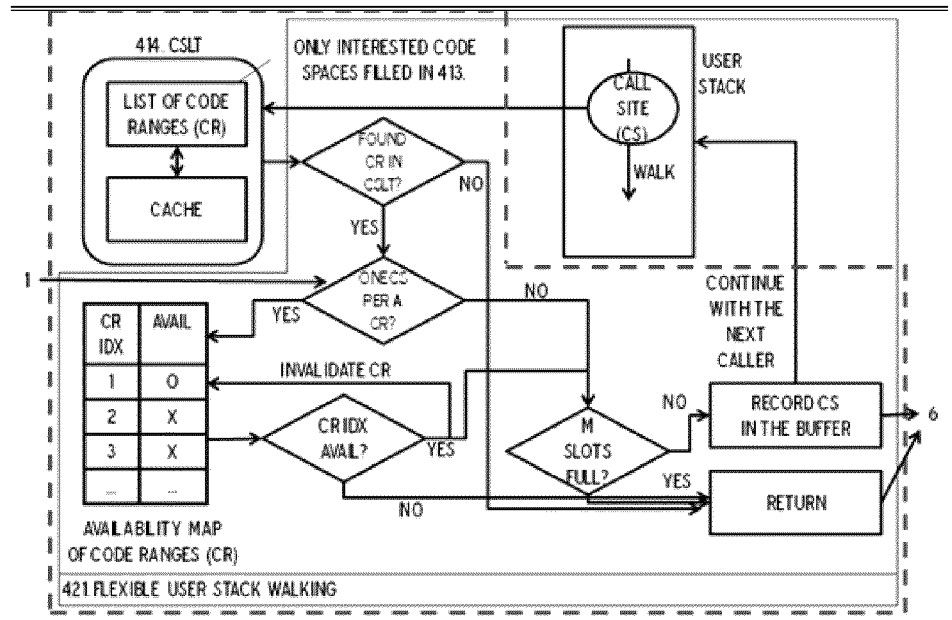
FIG. 8 details flexible user stack walking, component 421 shown in FIG. 7, in accordance with the invention.

The previous components (e.g., 412) determined which user space this component needs to look into. This component examines the execution status of the process by locating and scanning its user stack. As shown in FIG. 8, this component first identifies the kernel stack and then the user stack. The way to locate these stacks is dependent on the platform because it is related to how the architecture switches the kernel and user contexts.

Figure 7:
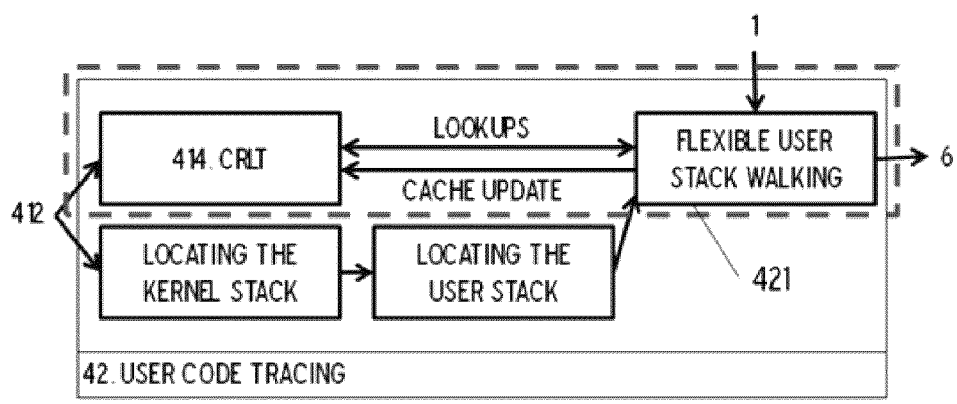
FIG. 7 details user code tracing, component 42 shown in FIG. 4, in accordance with the invention.

The component 421 collects user code information, user level call sites for the current kernel event, from the located user stack. This process performs several look ups of CRLT. Such lookups will update the cache of the CRLT to speed up later lookups. These operations are shown in FIG. 7.

Component 421: Flexible User Stack Walking

During the walking (scanning) of the user stack, our invention offers further tradeoffs to speed up the monitoring performance by using Tracing Mode. We call this mechanism Flexible User Stack Walking and it is presented in FIG. 8. FIG. 8 shows the flow chart of Flexible User Stack Walking.

In order to identify user code information, the stack is scanned (shown in the top right of the Figure) and it makes several choices in the collection of call sites depending on the Tracing Mode.

Tracing Modes provides two monitoring choices which can adjust the monitoring overhead.

The first choice is the scope of code ranges. For example, Mode 1 and 2 only focuses on the call sites in the main binary. So it can bring more efficiency in the performance by skipping call sites from other code ranges. This choice in the scope of code ranges is reflected in the component 413 when the process for monitoring is registered.

The second choice is the scope of call sites within a code range. Within a code range, there could be one or more number of call sites that belong to the range. This choice can decide which call sites will be included in the trace. For instance, Mode 2 and 4 collect all existing call sites inside the code range (s). However, other schemes can select certain call sites in code range(s). Mode 1 and 3 collects the last call sites within code ranges which represent the code making calls to external code modules.

The mechanism to address the second choice is presented in FIG. 8. This component first checks how many call sites (CS) will be allowed in a code range (CR) and it is shown as the condition, ONE CS PER A CR?. If only one is allowed (the YES case), it changes the status of the availability map of code ranges to prevent additional call sites from being included in the logs. If more than one call sites are allowed (the NO case), it goes to the code checking the slots for logging user code information.

Each entry of the unified trace of kernel and user code information is composed of one slot for kernel information and m slots for user call sites. The m slots are filled by the collected call sites depending on the Tracing Mode. Anytime when the slots become full (M SLOTS FULL?), the user stack walking is finished and returns with skipping all the rest un-scanned call sites.

Component 1: Tracing Modes

Figure 9:
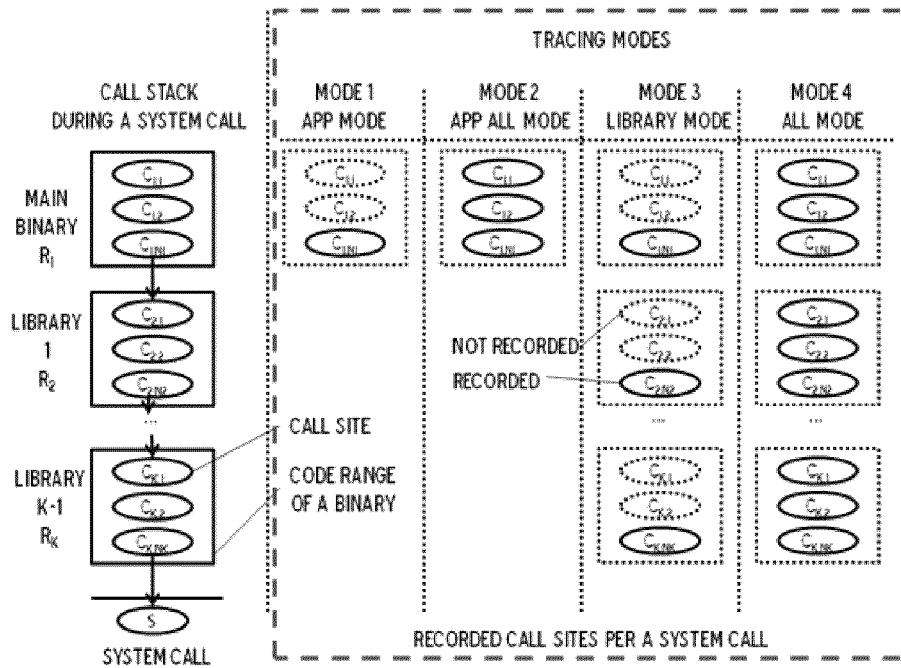
FIG. 9 details tracing modes, component 1 shown in FIG. 1 and FIG. 2, and user code information (call sites) captured during multi-mode stacking, where $R_k$ represents a code range of a binary (e.g., the main binary or a library). $C_{j,\,q}$ means the qth call site in the jth code range ($R_j$). The total number of records is limited to the recording size per a kernel event, m.

Referring to FIG. 9, shown are details of Tracing Modes (Component 1) and User Code Information (call sites) captured during Multi-Mode Stack Walking $R_k$ represents a code range of a binary (e.g., the main binary or a library). $C_{j,\ q}$ means the qth call site in the jth code range ($R_j$). The total number of records is limited to the recording size per a kernel event, m.

Tracing Modes provide the opportunity to tradeoff the monitoring efficiency and the depth of user code information by adjusting the scope of monitoring. FIG. 9 presents four trace recording schemes making several choices in the scope of code ranges and the scope of call sites within a code range. These schemes have been determined as example cases. Other schemes can be also defined by making different choices in the scopes. Details and the motivation of each mode is explained below.

Mode 1 (Application Mode)—This mode is the most efficient method in the monitoring overhead and the size of log information (default mode). With this mode, this invention captures the last function that invokes a system call in the main binary ($C_{1,\ N1}$). The maximum number of recorded call sites is 1. During the stack walking, as soon as a call site is captured from the main binary, the walking is finished.

Mode 2 (Application All Mode)—When this mode is set, this invention captures all call sites within the main binary ($C_{1,\ 1} \ldots C_{1,\ N1}$) as far as slots are available. The maximum number of call sites for this mode is max($N_1$, m).

Mode 3 (Library Mode)—In this mode this invention captures the last call sites of code ranges from the low layer to the high layer ($R_K \rightarrow R_1$) up to m call sites. It is useful to validate what kinds of code component or libraries are involved with a system call since a call site from each code range is sampled. The maximum number of call sites is max(k, m).

Mode 4 (All Mode)—This mode provides the most amount of details of user code information which is the full call stack information. The maximum number of total call sites will be max($\Sigma_{i=1}^{k} N_i$, m).

Figure 10:
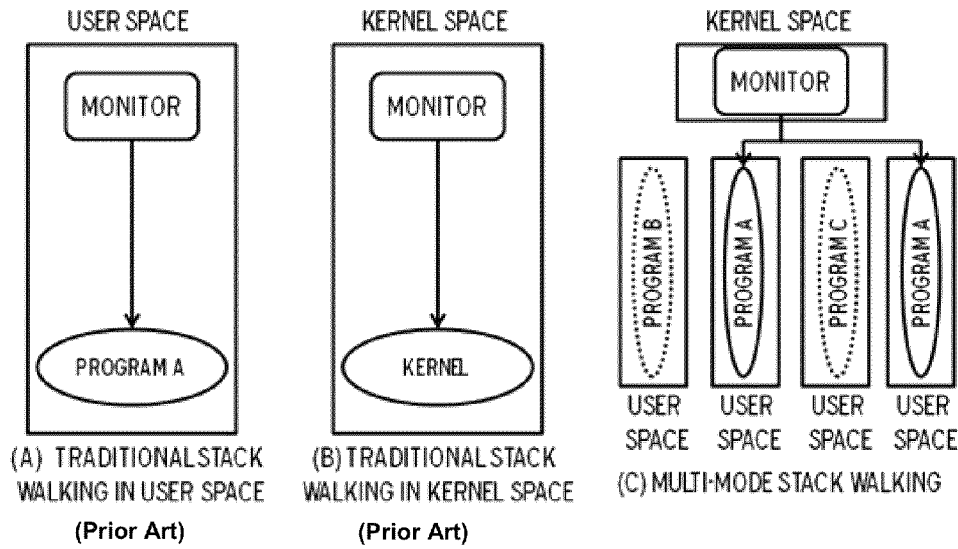
FIG. 10 depicts a comparison of tack walking mechanisms.
Figure 11:
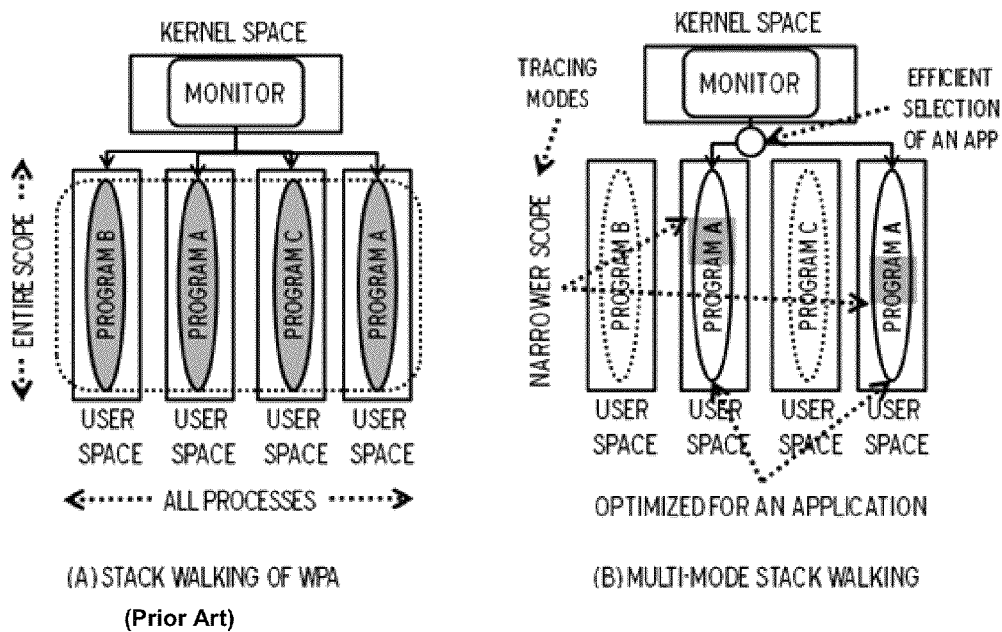
FIG. 11 depicts a comparison of Microsoft™ WPA and multi-mode stack walking.

FIG. 10 highlights the difference between existing stack walking mechanisms and this invention.

Traditional techniques were applied either to a single application program in the user space (FIG. 10(A)) or to the kernel in the kernel space (FIG. 10(B)). In these cases the monitor and the monitored subject were placed in the same space.

Multi-mode stack walking applies stack walking across the kernel and user space particularly to a dynamic set of processes for specific application software. Handling a dynamic set of multiple processes/threads is a real practical issue that will determine the applicability of the tool to large scale complex applications. This invention manages a dynamic set of multiple user processes/threads that belong to application software. This is done by efficient matching and management of a process pool presented in the component 41 (FIG. 4).

In addition, this invention introduces multiple tracing schemes (Tracing Modes) that enables the tradeoff between the monitoring performance and the depth of user code information. The scope of multiple code ranges (the component 413) and the call sites within the code range (the component 421) can be configured. Depending on the monitoring strategies such as inspecting the main binary, checking the list of libraries involved, and extracting the full call stack, these schemes provide flexible and efficient tracing of the unified kernel and user information.

From the foregoing, it can be appreciated that the presented invention improves the quality of existing kernel level monitoring system (e.g., Mevalet). For given kernel events, this invention provides user space code information corresponding to those kernel events, so that when anomaly is detected in the kernel level, developers can pinpoint and inspect the corresponding user program code. Moreover it can handle practical issues such as efficient tracking of a dynamic set of application processes. Unified kernel/user code information and practical applicability to complex software can significantly improve the usability of application debugging process in production systems.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitle, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for providing efficient unified tracing of kernel and user events with multi-mode stack walking in a software system, comprising steps of: receiving an input of tracing target and tracing mode information, said tracing target being a process or a thread of an application to be traced and the application's name is provided as input and tracing mode being a scheme to collect user code information which is involved with tracing performance and a storage amount for a log; executing kernel functions responsive to an operating system kernel execution; executing certain kernel functions being tracked and generating kernel events for logging by a kernel events generator; collecting the user code information for the certain kernel events with a multi-mode stack walking component; and combining the kernel events from the kernel events generator and the user code information from the multi-mode stack walking component for generating a kernel and user unified log, for the kernel events reflecting system performance bugs, the unified log enables improving debugging of code of the application because it pinpoints the corresponding user code information.

2. The method of claim 1, wherein said multi-mode stack walking comprises dynamic handling of multiple processes/threads for a specific application and multiple tracing modes which are recording schemes regarding multiple code spaces for efficiency in monitoring performance and storage of the user code information.

3. The method of claim 2, wherein the dynamic handling comprises 1) efficient dynamic management and selection of the tracing target for efficiently determining whether a current process in the software system is the tracing target and 2) dynamic tracing scope adjustment of traced processes/threads.

4. The method of claim 1, wherein the multi-mode stack walking component comprises a management of a tracing map for enabling a fast check, issues invalidating information of the tracing map are related to a dynamic changes in a processes' status.

5. The method of claim 1, wherein the multi-mode stack walking component comprises a management of a tracing map for enabling a fast check, and for issues related to a transformation of a process whereby a process can turn into another program by loading a program image, the management of the tracing map checks whether the transformation of the process is a tracing target and, if so, it is registered in the tracing target.

6. The method of claim 1, wherein the multi-mode stack walking component comprises a tracing map to provide information for obtaining user code information called stack walking and for the stack walking, the trace map looking up code ranges of the application and making this information ready when a new tracing target is detected, wherein the process is registered when the new tracing target is detected.

7. The method of claim 1, wherein said multi-mode stack walking component comprises registration of a tracing target that includes using a PID number of a newly determined tracing target, inspecting a memory map of the process stored in kernel data structures and creating an instance of a data structure called Code Range Lookup Table (CRLT) and connect the CRLT to the tracing map.

8. The method of claim 1, wherein said multi-mode stack walking component comprises registration of a tracing target that includes a lookup cache wherein if many code ranges exist in the application, the lookup cache keeps several most recent lookups and speeds up the lookups.

9. The method of claim 1, wherein said multi-mode stack walking component comprises registration of a tracing target that includes a speed up of monitoring by using a tracing scheme wherein, depending on focus of monitoring, the scheme allows a specification of code ranges deciding which code spaces will be considered during stack walking so that it can speed up the whole tracing.

10. The method of claim 1, wherein said multi-mode stack walking component comprises registration of a tracing target wherein depending on the input, the registration filling a CRLT with selected code ranges to speed up the user code information collection.

11. The method of claim 1, wherein said multi-mode stack walking comprises a flexible user stack walking wherein during walking or scanning of a user stack the flexible user stack walking enables tradeoffs to speed up monitoring performance.

12. The method of claim 1, said multi-mode stack walking comprises a flexible user stack walking wherein in order to identify the user code information a stack is scanned and said flexible user stack walking makes several choices in a collection of call sites responsive to tracing modes.

13. The method of claim 12, wherein said tracing modes provide two monitoring choices which can adjust a monitoring overhead, a first choice being a scope of code ranges and a second choice being a scope of call sites within a code range.

14. The method of claim 12, wherein one of said tracing modes, which is a scope of code ranges, entails where there is only a focus on call sites in a main binary and an increased efficiency in performance is enabled by skipping call sites from other code ranges and another one of said tracing modes, which is a scope of call sites within a code range, entails where within the code range there could be one or more number of call sites that belong to the code range, wherein one of the tracing modes can be chosen to decide which call sites will be included in a trace.

15. A hardware system having a processor for providing efficient unified tracing of kernel and user events with multi-mode stack walking in a software system, comprising: a module for receiving an input of tracing target and tracing mode information, said tracing target being a process or a thread of an application to be traced and the application's name is provided as input and tracing mode being a scheme to collect user code information which is involved with tracing performance and a storage amount for a log; a module for executing kernel functions responsive to an operating system kernel execution; a kernel events generator for executing certain kernel functions being tracked and generating kernel events for logging; a multi-mode stack walking component for collecting the user code information for the certain kernel events; and a kernel and user unified log generated by combining the kernel events from the kernel events generator and the user code information from the multi-mode stack walking component, for the kernel events reflecting system performance bugs, the unified log enables improving debugging of code of the application because it pinpoints the corresponding user code information.

16. The system of claim 15, wherein said multi-mode stack walking component comprises dynamic handling of multiple processes/threads for a specific application and multiple tracing modes which are recording schemes regarding multiple code spaces for efficiency in monitoring performance and storage of the user code information.

17. The system of claim 16, wherein the dynamic handling comprises 1) efficient dynamic management and selection of the tracing target for efficiently determining whether a current process in the software system is the tracing target and 2) dynamic tracing scope adjustment of traced processes/threads.

18. The system of claim 15, wherein the multi-mode stack walking component comprises a management of a tracing map for enabling a fast check, issues invalidating information of the tracing map are related to a dynamic changes in a processes' status.

19. The method of claim 15, wherein the multi-mode stack walking component comprises a management of a tracing map for enabling a fast check, and for issues related to a transformation of a process whereby a process can turn into another program by loading a program image, the management of the tracing map checks whether the transformation of the process is a tracing target and, if so, it is registered in the tracing target.

20. The method of claim 15, wherein the multi-mode stack walking component comprises a tracing map to provide information for obtaining user code information called stack walking and for the stack walking, the trace map looking up code ranges of the application and making this information ready when a new tracing target is detected, wherein the process is registered when the new tracing target is detected.

* * * * *